No. 871,601. PATENTED NOV. 19, 1907.
E. LAUPPE.
LOADING ATTACHMENT FOR WAGONS.
APPLICATION FILED JULY 5, 1907.
2 SHEETS—SHEET 1.
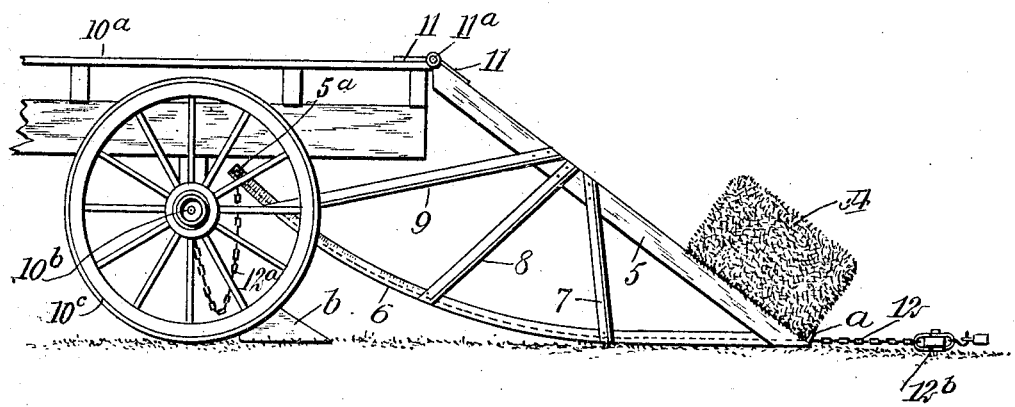
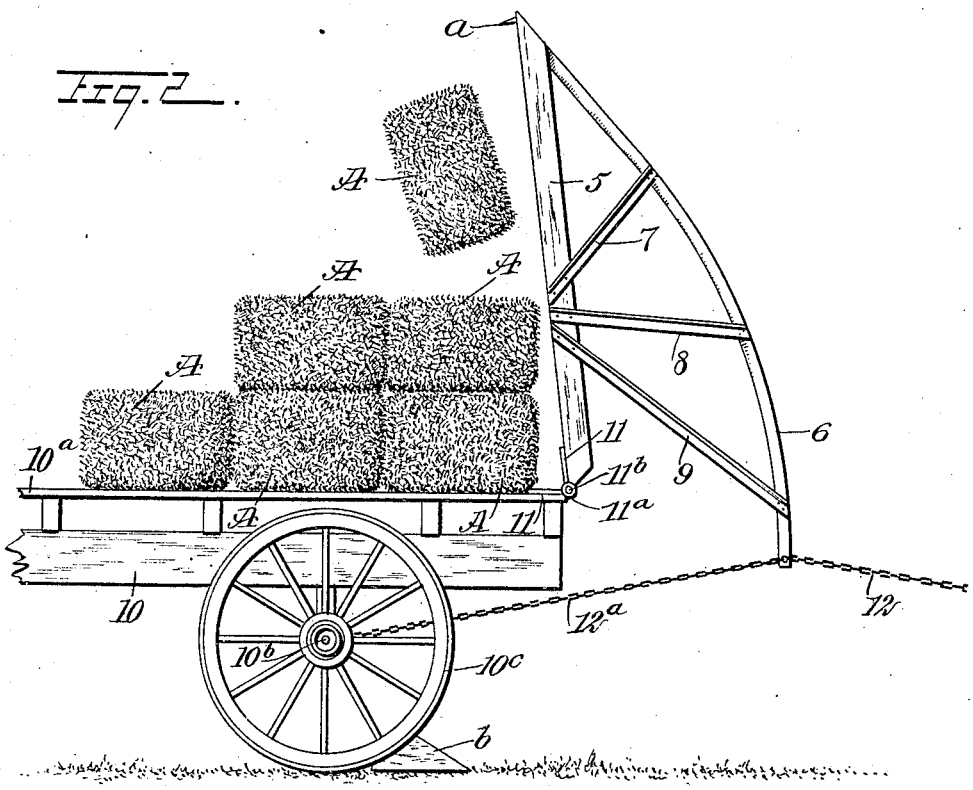
WITNESSES
H. Walker
Wm. P. Patton
INVENTOR
Edward Lauppe
BY Munn & Co.
ATTORNEYS No. 871,601.
PATENTED NOV. 19, 1907.
E. LAUPPE.
LOADING ATTACHMENT FOR WAGONS.
APPLICATION FILED JULY 5, 1907.
2 SHEETS—SHEET 2.
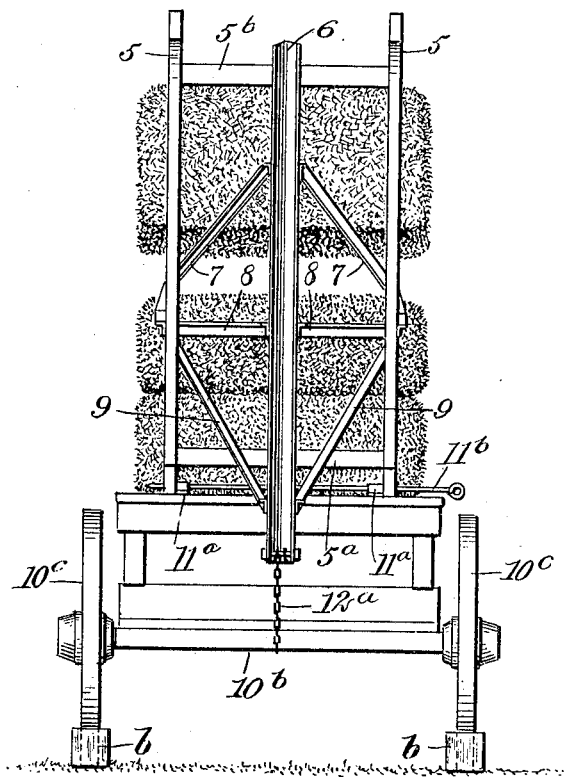
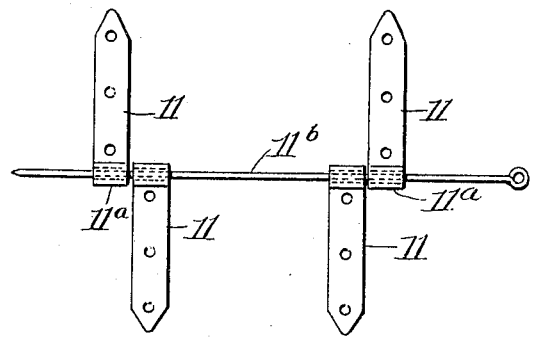
WITNESSES
N. Walker
Wm. P. Patton
INVENTOR
Edward Lauppe
BY Munn & Co
ATTORNEYS

UNITED STATES PATENT OFFICE.

EDWARD LAUPPE, OF ANTELOPE, CALIFORNIA.

LOADING ATTACHMENT FOR WAGONS.

No. 871,601.　　　　Specification of Letters Patent.　　　　Patented Nov. 19, 1907.

Application filed July 5, 1907. Serial No. 382,379.

*To all whom it may concern:*

Be it known that I, EDWARD LAUPPE, a citizen of the United States, and a resident of Antelope, in the county of Sacramento and State of California, have invented a new and Improved Loading Attachment for Wagons, of which the following is a full, clear, and exact description.

The object of this invention is to provide a simple, novel device that may be removably attached upon the rear end of a freight wagon, and afford means for utilizing horse power for loading bales of hay or other material on the wagon, and thus dispense largely with manual labor for such a purpose.

The invention consists in the novel construction and combination of parts, as is hereinafter described and defined in the appended claims.

Reference is to be had to the accompanying drawings forming a part of this specification, in which similar characters of reference indicate corresponding parts in all the views.

Figure 1 is a side view of the improved loading device removably connected with a wagon at its rear end, showing a bale of hay in position for elevation and deposit on the wagon bed; Fig. 2 is a similar view, but showing the operation of the device for loading a plurality of bales on the wagon bed; Fig. 3 is a rear end elevation of the improved loading device, arranged as represented in Fig. 2; and Fig. 4 is a detached plan view of a pair of hinges that are details of the invention.

The loading device may be connected with freight wagons of different capacities, it being mainly essential that the wagon have a flat bottom or bed for supporting a load.

The improvement comprises a rectangular frame, preferably consisting of two side bars 5, 5, that are held spaced apart in parallel planes by two cross bars $5^a$, $5^b$ affixed thereon near the ends of the side bars, as shown in Fig. 3. A guide trough 6, preferably formed of an angle iron bar, is secured by one end upon the cross bar $5^b$ at the center of said cross bar. The guide trough 6 is bent to give it arcuate form, and is held braced in position centrally on the frame by the preferably angle iron brace bars 7, 7, 8, 8, and 9, 9, that are disposed as shown in Fig. 3. The braces 7 are forwardly and diagonally extended from the side bars 5, 5, near the longitudinal centers of the latter, toward the guide trough 6, whereon said braces are oppositely secured. At the ends of the braces 7, that are secured upon the side bars, the outer ends of the braces 8, 8, are secured thereupon, and from the side bars are extended in alinement toward the trough 6, whereon they are affixed oppositely by suitable means. The braces 9, 9, are attached by one end of each upon the side bars 5, adjacent to the outer ends of the braces 8, and thence trend toward the upper end of the trough 6, whereon their remaining ends are oppositely secured.

As shown in Figs. 1 and 2, the braces 8 and 9, are so proportioned in length, that they hold the arcuate guide trough projected away from the normally upper end of the frame and cross bar $5^a$ thereon. The frame side bars 5, 5, at their ends nearest to the top cross bar $5^a$, are hinged upon corresponding side bars $10^a$ on the body of a wagon 10, this hinged connection permitting the completed loading attachment to be rocked above and below the horizontal plane of the bottom of the wagon 10.

Preferably the pair of hinges employed each consist of two elongated leaves 11, 11, each having a tubulate end $11^a$, the transverse holes therein being of equal diameter. The hinge leaves 11 are detachably connected by a pintle rod $11^b$, as shown in Figs. 3 and 4, so that the two members of each hinge may be readily detached when this is desired, by removal of the pintle rod. .

Two corresponding hinge leaves 11 of the two similar hinges, are secured upon the side bars $10^a$ of the wagon 10, at their rear ends, and the other hinge leaves are affixed upon the side bars 5, 5, of the loader frame at their normally upper ends, and are so spaced apart that these leaves may be introduced between the other pair of hinge leaves 11, adjacent thereto, so that the tubulate ends $11^a$ on the hinge leaves, may all be alined for connection with the pintle rod $11^b$, as before mentioned.

The wagon 10 of common construction and shown partially in the drawings, is supported for progressive movement at its rear end by an axle $10^b$ and wheels $10^c$. A flexible connection, such as a chain 12, is attached by one end upon the axle $10^b$ and is extended thence toward the upper end of the guide trough 6, whereon said chain or rope is attached at such a distance from the axle, that the section $12^a$ of the chain 12, between the axle and guide trough, will become taut when the loader frame is disposed so as to give it an erect position, as is clearly shown in Fig. 2.

Upon the ends of each of the side bars 5, 5, that are adjacent to the cross bar $5^b$, a stout pin or spike $a$, is erected, which pins serve as abutments, to prevent a load from slipping off of the loader frame. The chain 12 is extended a proper length from the loader frame, and upon its free end is attached a cross bar $12^b$ or the like, for connection therewith of a draft animal.

It is to be noted that the diagonal arrangement of the angle iron brace bars as described, affords rigid support for the loader frame, and while it is very light, is capable of resisting heavy load strain in every direction, which is essential for durability and efficiency.

In service the wheels $10^c$ are temporarily blocked as at $b$, which prevents a rearward movement of the wagon. If hay, straw, or other material in bales, such as A, is to be loaded upon a wagon 10, this is readily accomplished by use of the improvement as follows:

The loader frame is first connected to the wagon by the hinges as before explained, and disposed in an inclined position, extending from the hinged end to the ground whereon the lower end of said frame rests. The chain 12 is stretched upon the ground by the draft animal attached thereto, so that it will be disposed lengthwise in the channel of the guide trough 6, as shown by dotted lines in Fig. 1. A bale A is now rolled upon the end of the loader frame that rests upon the ground, and disposed transversely in contact with the abutment pins $a$. The chain 12 is now drawn upon by the attached animal, not shown, which will pull upon the chain where it is attached to the end of the guide trough 6, and thus cause the loader frame and bale thereon to be rocked upward into an erect position, the impetus causing the bale to be discharged upon the bed of the wagon, the portion $12^a$ of the chain preventing the frame from tipping forwardly. The loader frame may be lowered quickly by slackening the chain 12 and the operation repeated, each bale as it is loaded being piled up as represented in Figs. 2 and 3, until a full load is placed upon the bed of the wagon.

It will be evident that by an employment of the improved loading device, the work of loading bales of any material may be greatly expedited, and manual labor be, to a large extent, dispensed with, as but little exertion is necessary to arrange the bales in tiers upon the wagon after they are hoisted and deposited thereupon.

The entire device may be readily detached from the wagon by separation of the hinged connection and release of the end of the chain 12 from the axle $10^b$, and, if desired, hinge leaves on another wagon that mate those on the loader frame, may be connected with the latter and receive a load of baled material, as hereinbefore explained.

Having thus described my invention, I claim as new and desire to secure by Letters Patent:

1. A bale loader, comprising a rectangular frame, a guide trough thereon, and braces extending from the sides of the frame into engagement with the guide trough, in combination with a wagon, whereon the ends of the frame are hinged, and a flexible connection extended from the wagon rearwardly through the guide trough.

2. A bale loader, comprising a rectangular frame formed of two side bars, and two cross bars at the respective ends of said side bars, a bent guide trough parallel with the side bars and centrally secured by one end on a respective cross bar, said guide trough being spaced from the other cross bar, and a plurality of braces diagonally extended from the frame side bars into engagement with the guide trough, in combination with a wagon, hinges detachably connecting the sides of the wagon with the respective ends of the side bars, and a flexible connection secured by one end on the wagon and thence extended rearwardly through the trough.

3. A bale loader, comprising a rectangular frame formed of two side bars, and two cross bars at the respective ends of said side bars, an angle iron guide trough having arcuate form, held parallel with the side bars and centrally on one of said cross bars, and a plurality of brace bars extended from opposite sides of the guide trough diagonally and secured by their outer ends on the frame side bars, whereby the other end of the guide trough is spaced from the remaining cross bar, in combination with a wagon, separable hinges secured on the sides of the wagon and on the ends of the frame side bars, a flexible connection extended from the rear axle of the wagon into connection with one end of the guide trough and thence through said trough, the remaining end of the flexible connection having means for connecting a draft animal therewith.

In testimony whereof I have signed my name to this specification in the presence of two subscribing witnesses.

EDWARD LAUPPE.

Witnesses:
J. D. LAUPPE,
W. C. LEWIS.